United States Patent
Fume et al.

(10) Patent No.: US 10,276,150 B2
(45) Date of Patent: Apr. 30, 2019

(54) CORRECTION SYSTEM, METHOD OF CORRECTION, AND COMPUTER PROGRAM PRODUCT

(71) Applicant: Kabushiki Kaisha Toshiba, Minato-ku, Tokyo (JP)

(72) Inventors: Kosei Fume, Kawasaki Kanagawa (JP); Taira Ashikawa, Kawasaki Kanagawa (JP); Masayuki Ashikawa, Kawasaki Kanagawa (JP); Hiroshi Fujimura, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 85 days.

(21) Appl. No.: 15/440,497

(22) Filed: Feb. 23, 2017

(65) Prior Publication Data
US 2018/0075839 A1   Mar. 15, 2018

(30) Foreign Application Priority Data

Sep. 12, 2016  (JP) ................... 2016-177813

(51) Int. Cl.
*G10L 15/00*  (2013.01)
*G10L 15/01*  (2013.01)
(Continued)

(52) U.S. Cl.
CPC .......... *G10L 15/01* (2013.01); *G06F 3/04842* (2013.01); *G06F 3/167* (2013.01); *G10L 15/22* (2013.01)

(58) Field of Classification Search
CPC ..................................................... G10L 15/00
(Continued)

(56) References Cited

U.S. PATENT DOCUMENTS 5,151,940 A * 9/1992 Okazaki .................. G10L 15/00
                                                         704/253
5,799,273 A * 8/1998 Mitchell .................. G06F 3/16
                                                         704/235
(Continued)

FOREIGN PATENT DOCUMENTS

JP   2000-029492 A   1/2000
JP   2002-287792 A   10/2002
(Continued)

OTHER PUBLICATIONS

Nagatsuma, R., et al., "Effective Captioning Method by Using Crowd-Sourcing Approach", IEICE Technical Report, WIT2012-25 (Dec. 2012), 17 pgs. Copyright 2012.

*Primary Examiner* — Michael C Colucci
(74) *Attorney, Agent, or Firm* — Knobbe, Martens, Olson & Bear, LLP (57) ABSTRACT

A correction system of the embodiment includes an interface system, a calculator, a generator, and a display controller. The interface system receives correction information for correcting a voice recognition result. The calculator estimates a part of the voice recognition result to be corrected and calculates a degree of association between the part to be corrected and the correction information. The generator generates corrected display information comprising at least one of the correction information and the part to be corrected using a display format corresponding to the degree of association. The display controller outputs the corrected display information on a display.

9 Claims, 9 Drawing Sheets

(51) Int. Cl.
*G06F 3/0484* (2013.01)
*G06F 3/16* (2006.01)
*G10L 15/22* (2006.01)

(58) Field of Classification Search
USPC ............ 704/9, 270, 257, 253, 252, 251, 247
See application file for complete search history.

(56) References Cited

U.S. PATENT DOCUMENTS

| | | | |
|---|---|---|---|
| 6,611,802 B2* | 8/2003 | Lewis .................... | G06F 17/273 704/235 |
| 7,356,467 B2* | 4/2008 | Kemp .................... | G10L 15/22 704/252 |
| 7,412,383 B1 | 8/2008 | Alonso et al. | |
| 7,444,286 B2 | 10/2008 | Roth et al. | |
| 7,729,917 B2* | 6/2010 | Miyamoto .............. | G10L 15/22 704/270 |
| 7,983,912 B2* | 7/2011 | Hirakawa ............... | G10L 15/22 704/231 |
| 8,311,832 B2 | 11/2012 | Miyamoto et al. | |
| 8,756,057 B2 | 6/2014 | Miller et al. | |
| 9,099,089 B2 | 8/2015 | Dzik et al. | |
| 9,159,319 B1* | 10/2015 | Hoffmeister ............ | G10L 15/08 |
| 2002/0099542 A1* | 7/2002 | Mitchell ............. | G06F 17/2241 704/231 |
| 2002/0184022 A1* | 12/2002 | Davenport ............. | G10L 15/22 704/247 |
| 2004/0024601 A1* | 2/2004 | Gopinath ................ | G10L 15/22 704/270 |
| 2008/0306738 A1* | 12/2008 | Lee ........................ | G09B 19/04 704/236 |
| 2011/0208507 A1* | 8/2011 | Hughes ................. | G06F 3/0237 704/9 |
| 2012/0072210 A1* | 3/2012 | Suzuki ..................... | H04B 3/23 704/226 |
| 2013/0151240 A1* | 6/2013 | Myslinski ............... | G06F 17/20 704/9 |
| 2013/0158984 A1* | 6/2013 | Myslinski ............... | G06F 17/28 704/9 |
| 2014/0012580 A1* | 1/2014 | Ganong, III ........ | G10L 15/1815 704/257 |
| 2015/0149163 A1* | 5/2015 | VanBlon ................. | G10L 15/08 704/231 |
| 2016/0092438 A1* | 3/2016 | Sonoo ................... | G06F 17/289 704/2 |
| 2017/0270086 A1 | 9/2017 | Fume et al. | |

FOREIGN PATENT DOCUMENTS

| | | |
|---|---|---|
| JP | 2004-151614 A | 5/2004 |
| JP | 2004-207821 A | 7/2004 |
| JP | 2004-334133 A | 11/2004 |
| JP | 2006-211636 A | 8/2006 |
| JP | 2006-228131 | 8/2006 |
| JP | 2007-093789 A | 4/2007 |
| JP | 2008-051895 A | 3/2008 |
| JP | 2008-210500 A | 9/2008 |
| JP | 2009-187349 | 8/2009 |
| JP | 2011-002656 | 1/2011 |
| JP | 2011-238047 | 11/2011 |
| JP | 2015-056154 A | 3/2015 |
| JP | 2015-531915 A | 11/2015 |
| JP | 2017-167368 | 9/2017 |

* cited by examiner

FIG.7A (1) NOT "$1" BUT "$2"

(2) ERRONEOUS TRANSCRIPTION "$1" → CORRECTION "$2"

(3) "$2" IS CORRECT (4) "$2"

FIG.7B (1) NOT "TSU-SAI" BUT "TSUSAI"
    201                    202

(2) ERRONEOUS TRANSCRIPTION "TSU-SAI" → CORRECTION "TSUSAI"
                                      201              202

(3) "TSUSAI" IS CORRECT (4) "TSUSAI"    202

202

FIG.7C (1) "right" change to "write"
 203                      204

(2) Prior Transcription "right" → Correction "write"
                        203              204

(3) corrected "write"
              204

(4) "write"
     204

CORRECTION SYSTEM, METHOD OF CORRECTION, AND COMPUTER PROGRAM PRODUCT

CROSS-REFERENCE TO RELATED APPLICATIONS

This application is based upon and claims the benefit of priority from Japanese Patent Application No. 2016-177813, filed on Sep. 12, 2016; the entire contents of which are incorporated herein by reference.

FIELD

The present invention relates to a correction system, a method of correction, and a computer program product.

BACKGROUND

Use of conventional voice recognition is mostly limited to an expressible speech composed using a predetermined input information such as a voice command and a phrase. However, expansion of computational resources allows use of a large-scale corpus, and algorithms capable of handling large-scale data are being widely developed. In addition, frameworks such as Software as a Service (SaaS) and Platform as a Service (PaaS) are now available. With these changes, interfaces and applications for a dialogue using voice recognition are today in widespread use. The voice recognition is used for, for example, real-time captioning directly displaying voice as text.

Conventional technologies, however, have difficulty in properly correcting a voice recognition result on a real-time basis. For example, in correcting caption information displayed in a time series, an editor needs to have steps of following a target range to be corrected, designating a range to be corrected, inputting a corrected text, and finalizing a corrected content. Furthermore, after a corrected result is displayed, due to discrepancy resulting from a semantic and time-series factors between the text before corrected and the latest presented text, the corrected result may prevent viewers from understanding the text content.

DETAILED DESCRIPTION

According to one embodiment, a correction system of the embodiment includes an interface system, a calculator, a generator, and a display controller. The interface system configured to receive correction information for correcting a voice recognition result. The calculator, implemented in computer hardware, configured to estimate a part of the voice recognition result to be corrected and calculate the degree of association between the part to be corrected and the correction information. The generator, implemented in computer hardware, configured to generate corrected display information comprising at least one of the correction information and the part to be corrected using a display format corresponding to the degree of association. The display controller configured to output the corrected display information on a display.

An embodiment of a correction system, a method of correction, and a computer program product will now be described in detail with reference to the accompanying drawings.

An exemplary device configuration in the correction system of the embodiment will be described.

Device Configuration in Correction System

Figure 1:
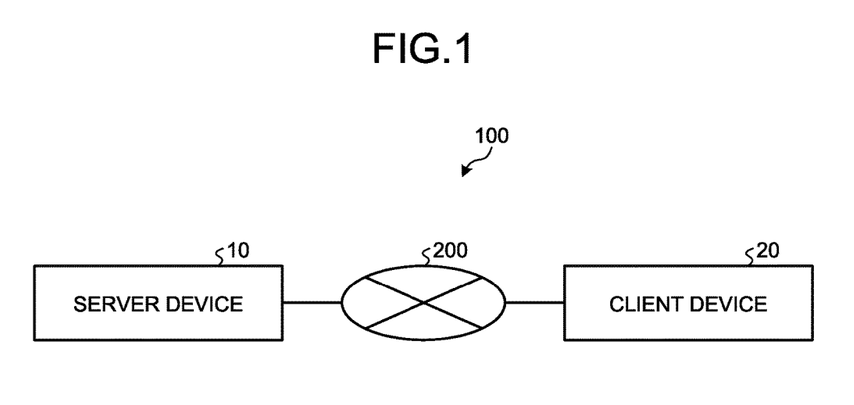
FIG. 1 is a diagram illustrating an exemplary device configuration of a correction system in an embodiment.

FIG. 1 is a diagram illustrating an exemplary device configuration in a correction system 100 according to the embodiment. The correction system 100 of the embodiment includes a server device 10 and a client device 20. Examples of the server device 10 and the client device 20 include a personal computer and a smart device. The server device 10 and the client device 20 are connected with each other via a network 200. The network 200 may be wired communication or wireless communication. The network 200 may be implemented in a combination of wired communication and wireless communication.

An exemplary functional configuration of the correction system 100 will now be described.

Functional Configuration of Correction System

Figure 2:
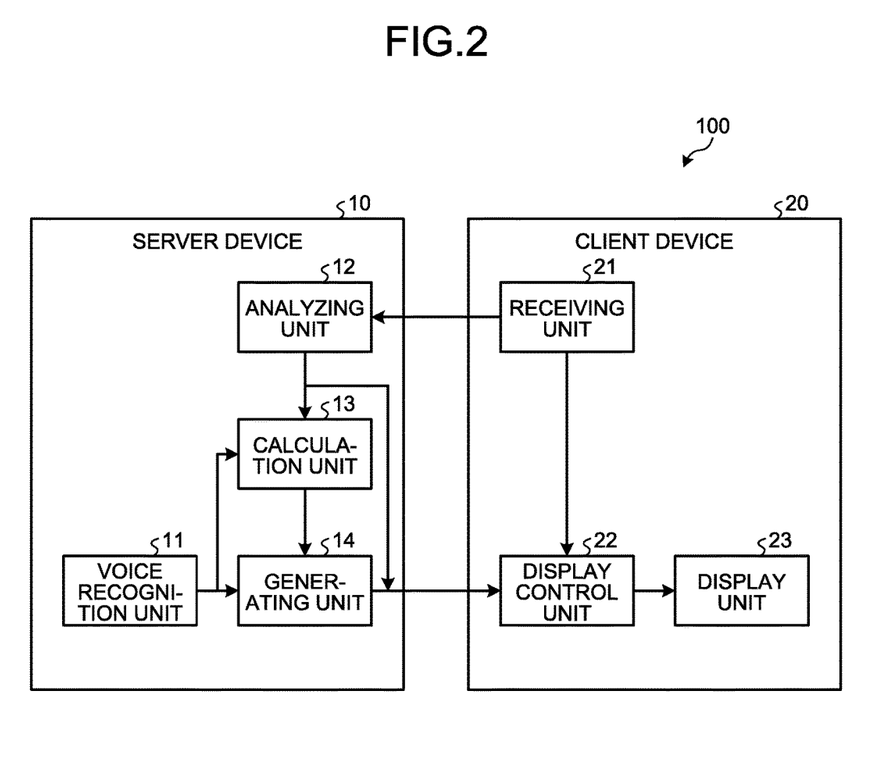
FIG. 2 is a diagram illustrating an exemplary functional configuration of the correction system in the embodiment.

FIG. 2 is a diagram illustrating an exemplary functional configuration of the correction system 100 in the embodiment. The correction system 100 of the embodiment includes a voice recognition unit 11, an analyzing unit 12, a calculation unit 13, a generating unit 14, a receiving unit 21, a display control unit 22, and a display unit 23. In the example of FIG. 2, the voice recognition unit 11, the analyzing unit 12, the calculation unit 13, and the generating unit 14 are implemented by the server device 10, whereas the receiving unit 21, the display control unit 22, and the display unit 23 are implemented by the client device 20. Each functional block may be implemented by any desired device. All functional blocks may be implemented by one device.

The voice recognition unit 11 recognizes voice and obtains a voice recognition result. Examples of the voice recognition result include text data with likelihood and a confusion network. For example, the voice recognition unit 11 inputs a voice recognition result with the highest likelihood to the generating unit 14.

The generating unit 14 receives a voice recognition result from the voice recognition unit 11 and generates display information including the voice recognition result. The generating unit 14 transmits the display information to the display control unit 22 of the client device 20.

The display control unit 22 receives the display information from the server device 10 and displays the display information on the display unit 23.

The receiving unit 21 receives correction information for correcting the voice recognition result included in the display information from the user and transmits the correction information to the analyzing unit 12 of the server device 10. Examples of the correction information include text data.

The analyzing unit 12 receives the correction information from the client device 20 and analyzes the correction information. If a control sign is included in the correction information, the analyzing unit 12 performs control processing based on the control sign.

Examples of the control sign include "#". "#" is a control sign for having a character string beginning with "#" directly displayed as an input of a text chat. If "#" is included in the correction information, the analyzing unit 12 removes "#" from the correction information. The analyzing unit 12 transmits the correction information with "#" removed therefrom to the display control unit 22 of the client device 20. With this process, a character string beginning with "#" is directly displayed on the display unit 23 as an input of a text chat.

Examples of the control sign may include a shortcut key associated with a certain operation. Examples of the certain operation include designation of a display format (see FIGS. 7A to 7C) used in displaying later-described corrected display information. If a shortcut key is included in the correction information, the analyzing unit 12 removes the shortcut key from the correction information. The analyzing unit 12 performs control processing to the correction information with the shortcut key removed therefrom based on the shortcut key. If the control processing based on the shortcut key requires processing of another functional block, the analyzing unit 12 asks the functional block for the processing and receives a processing result from the functional block.

If no control signs are included in the correction information, the analyzing unit 12 inputs the correction information to the calculation unit 13.

The calculation unit 13 receives the correction information from the analyzing unit 12 and receives a voice recognition result of a processing target from the voice recognition unit 11. The voice recognition result as a processing target is, for example, a voice recognition result input from the voice recognition unit 11 to the generating unit 14 during a time period between a first timing when the server device 10 receives the correction information from the client device 20 and a second timing prior to the first timing by a certain time. With this process, the calculation unit 13 is able to acquire a voice recognition result, for example, being currently displayed on the display unit 23.

The calculation unit 13 estimates a part to be corrected included in the voice recognition result and calculates the degree of association between the part to be corrected and the correction information. The detail of the calculation processing for calculating the degree of association will be described later with reference to the flowchart of FIG. 5.

The calculation unit 13 inputs the correction information, the part to be corrected, and the degree of association to the generating unit 14 in a manner associated with one another.

The generating unit 14 receives the correction information, the part to be corrected, and the degree of association from the calculation unit 13 and generates corrected display information including at least one of the correction information and the part to be corrected using a display format corresponding to the degree of association. The generation processing for generating the corrected display information will be described later in detail with reference to the flowchart of FIG. 6.

The generating unit 14 sends the corrected display information to the display control unit 22 of the client device 20.

The display control unit 22 receives the corrected display information from the generating unit 14 and displays corrected display information selected by the user from among the received corrected display information. Exemplary display of the corrected display information will be described later in detail with reference to FIGS. 9A to 9C.

An exemplary method of correction in the embodiment will now be described.

Method of Correction

Figure 3:
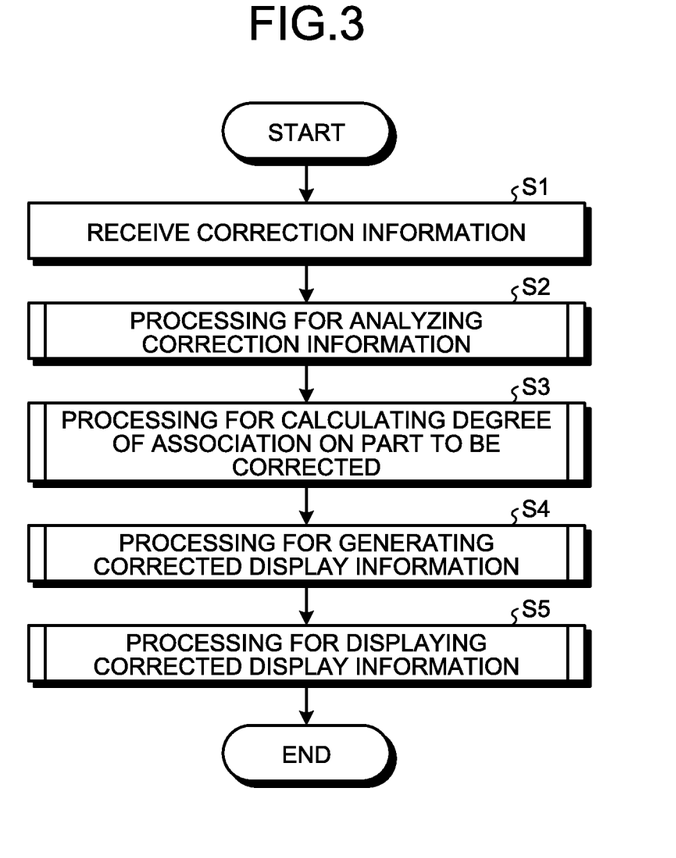
FIG. 3 is a flowchart illustrating an exemplary method of correction in the embodiment.

FIG. 3 is a flowchart illustrating an exemplary method of correction in the embodiment. The receiving unit 21 receives correction information, based on which the voice recognition result included in the display information is corrected, from the user (Step S1).

The analyzing unit 12 performs analysis processing to the correction information received in the processing of Step S1 (Step S2). The analysis processing on the correction information will be described later in detail with reference to the flowchart of FIG. 4.

The calculation unit 13 performs processing for calculating the degree of association of the part to be corrected included in the voice recognition result (Step S3). The processing for calculating the degree of association will be described later in detail with reference to the flowchart of FIG. 5.

The generating unit 14 performs processing for generating corrected display information (Step S4). The processing for generating the corrected display information will be described later in detail with reference to the flowchart of FIG. 6.

The display control unit 22 performs processing for displaying the corrected display information (Step S5). The processing for displaying the corrected display information will be described later in detail with reference to the flowchart of FIG. 8.

Analysis Processing on Correction Information

Figure 4:
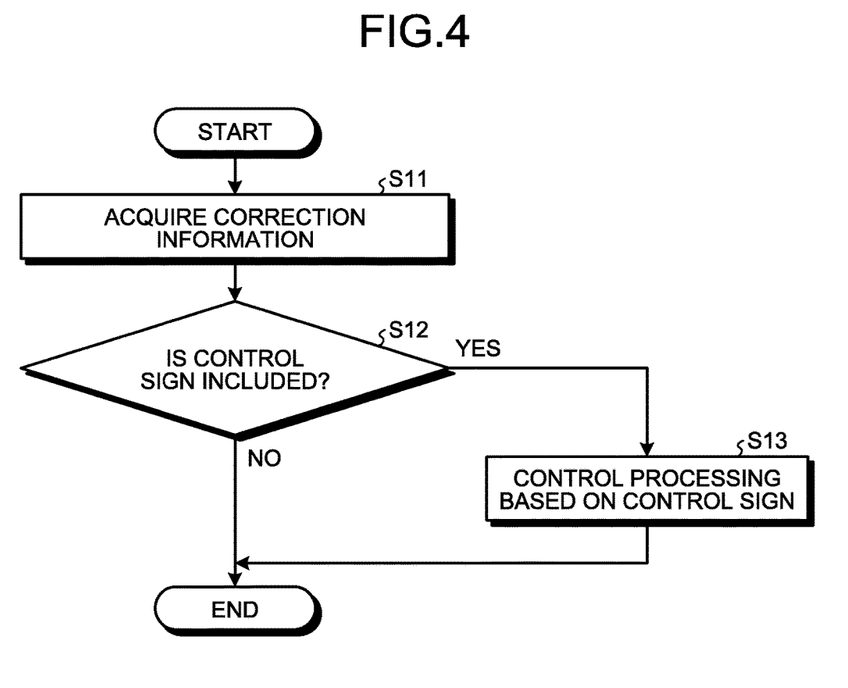
FIG. 4 is a flowchart illustrating exemplary analysis processing in the embodiment.

FIG. 4 is a flowchart illustrating exemplary analysis processing in the embodiment. The analyzing unit 12 acquires correction information received by the receiving unit 21 (Step S11). The analyzing unit 12 determines whether the correction information acquired in the processing of Step S11 includes a control sign described as above (Step S12). If a control sign is included (Yes at Step S12), the analyzing unit 12 performs the above-described control processing based on the control sign (Step S13). If no control signs are included (No at Step S12), the control processing is completed.

Calculation Processing of the Degree of Association

Figure 5:
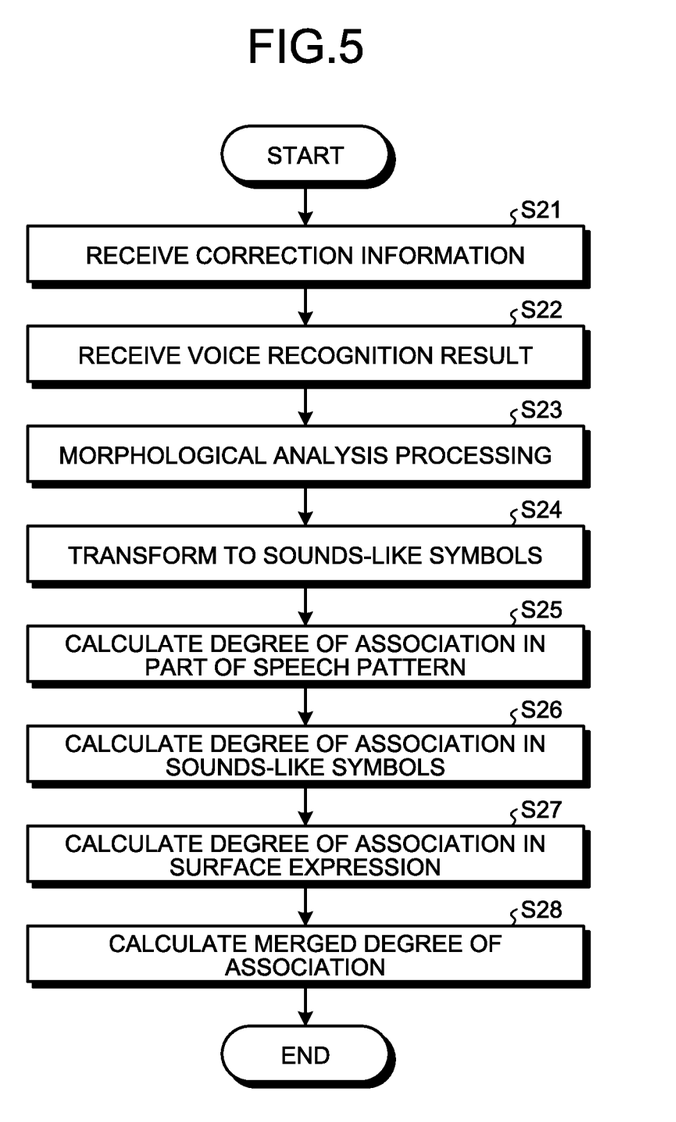
FIG. 5 is a flowchart illustrating exemplary calculation processing in the embodiment.

FIG. 5 is a flowchart illustrating exemplary calculation processing in the embodiment. The calculation unit 13 receives the above-described correction information from the analyzing unit 12 (Step S21) and further receives the above-described voice recognition result as a processing target from the voice recognition unit 11 (Step S22).

The calculation unit 13 performs morphological analysis processing to the correction information received in the processing of Step S21 (Step S23). Examples of the morphological analysis processing includes detection processing for detecting a separation between morphemes of a word or the like included in the correction information and specifying processing for specifying the part of speech of the word.

The calculation unit 13 transforms the voice recognition result including a sentence containing Chinese characters and the Japanese syllabary characters into sounds-like symbols (Step S24).

The calculation unit 13 calculates the degree of association between a word or a phrase included in the voice recognition result and the correction information from the viewpoint of a part-of-speech pattern (Step S25). The degree of association obtained by the processing of Step S25 represents the degree of association in the part of speech between the part to be corrected and the correction information. The degree of association in the part-of-speech pattern is calculated based on the degree of concordance in the part-of-speech emerging pattern between a word or a phrase included in the voice recognition result and the correction information.

Specifically, the degree of association in the part-of-speech pattern calculated in the processing of Step S25 is calculated with Md (t, s)={the same part-of-speech=1.0, different part-of-speech=0.0}. In the expression, t (target) represents an element unit of the processing target included in the voice recognition result, whereas s (source) represents an element unit of the processing target included in the correction information. In the processing of Step S25, t is a part of speech of a word included in the voice recognition result whereas s is a part of speech of a word included in the correction information.

The calculation unit 13 calculates the degree of association between a word or a phrase included in the voice recognition result and the correction information from the viewpoint of the sounds-like symbol (Step S26). The degree of association obtained in the processing of Step S26 represents the degree of association in sound between the part to be corrected and the correction information. The degree of association in the sounds-like symbol is calculated based on the degree of concordance in sound between a word or a phrase included in the voice recognition result and the correction information.

Specifically, the degree of association in the sounds-like symbol calculated in the processing of Step S26 is calculated, for example, using Rd (t, s)=LevenshteinDistance (t, s). In the processing of Step S26, t is a sound of a word or a phrase included in the voice recognition result whereas s is a sound of a word or a phrase included in the correction information. LevenshteinDistance (t, s) represents the Levenshtein distance between the sound t and the sound s.

The calculation unit 13 calculates the degree of association between a word or a phrase included in the voice recognition result and the correction information from the viewpoint of the surface expression (Step S27). The degree of association obtained in the processing of Step S27 represents the degree of association in the surface expression between the part to be corrected and the correction information. The degree of association in the surface expression is calculated based on the degree of concordance in the surface expression between a word or a phrase included in the voice recognition result and the correction information.

Specifically, the degree of association in the surface expression calculated in the processing of Step S27 is calculated, for example, using Ed (t, s)=LevenshteinDistance (t, s). In the processing of Step S27, t is a surface expression of a word or a phrase included in the voice recognition result whereas s is a surface expression of a word or a phrase included in the correction information. LevenshteinDistance (t, s) represents the Levenshtein distance between the surface expression t and the surface expression s.

The calculation unit 13 calculates a merged degree of association (Step S28). The calculation unit 13 calculates the merged degree of association (Merged Concordance (MC)), for example, using following Expression (1).

$$MC(t,s) = \alpha \times Md(t,s) + \beta \times Rd(t,s) + \gamma \times Ed(t,s) \quad (1)$$

In this expression, $\alpha$, $\beta$, and $\gamma$ are weighting coefficients representing how much bias is applied to each viewpoint. In this case, the weight is adjusted by preliminarily setting the values satisfying $\alpha+\beta+\gamma=1$ (for example, $\alpha=0.1$, $\beta=0.6$, $\gamma=0.3$).

From among words and phrases included in the voice recognition result, a word or a phrase having the degree of association MC (t, s), which is obtained in the processing of Step S28, equal to or greater than a threshold (a third threshold) is estimated to be a part to be corrected included in the voice recognition result. The third threshold is, for example, 0.2.

In the following description of the embodiment, the merged degree of association calculated by Expression (1) will be simply referred to as a degree of association. Any desired method of calculating the degree of association is applicable. For example, by taking $\alpha=0$, the degree of association Md (t, s) in the part of speech can be disregarded.

Generation Processing of Corrected Display Information

Figure 6:
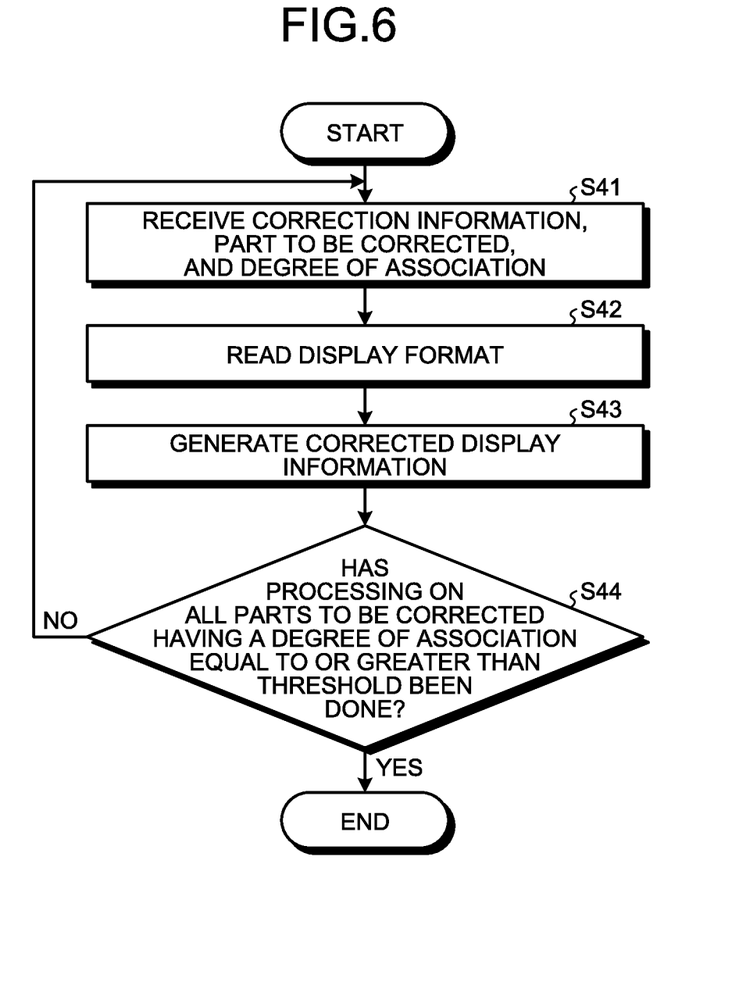
FIG. 6 is a flowchart illustrating exemplary generation processing in the embodiment.

FIG. 6 is a flowchart illustrating exemplary generation processing in the embodiment. The generating unit 14 receives correction information and a part to be corrected, and the degree of association between the correction information and the part to be corrected from the calculation unit 13 (Step S41).

The generating unit 14 reads a display format (a correction format) (Step S42).

Figure 7A:
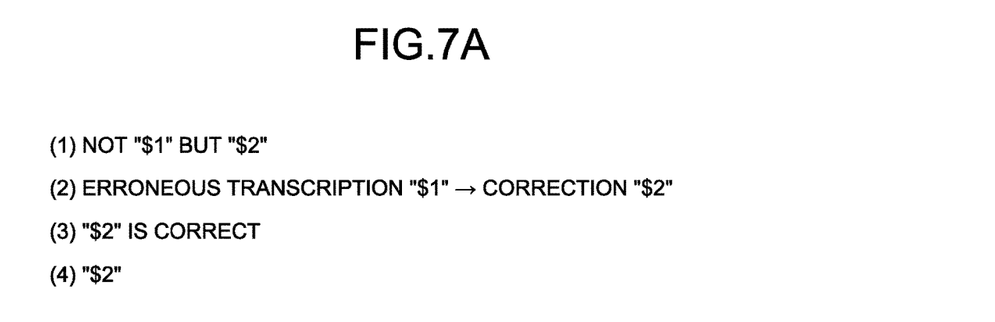
FIG. 7A is a diagram that illustrates exemplary display formats (correction formats) for displaying corrected display information in the embodiment.

FIG. 7A is a diagram illustrating exemplary display formats (correction formats) for displaying corrected display information in the embodiment. The display format (1) and the display format (2) each include a variable $1 and a variable $2. The variable $1 represents a word or a phrase as a part to be corrected. The variable $2 represents a word or a phrase as the correction information. The display format (3) and the display format (4) both include the variable $2. In the display format (3) and the display format (4), no parts to be corrected can be specified from the sentences.

Figure 7B:
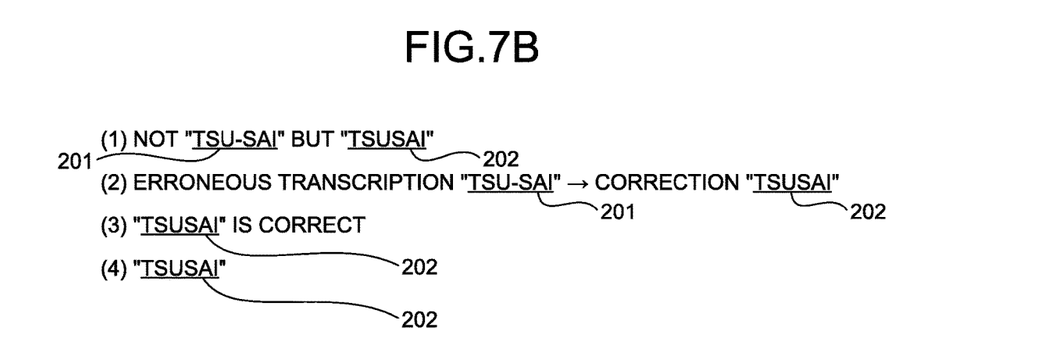
FIG. 7B is a diagram that illustrates application examples (in the case of the Japanese language) corresponding to the display formats of FIG. 7A.

7B is a diagram illustrating application examples (in the case of the Japanese language) corresponding to the display formats of FIG. 7A. In the examples of FIG. 7B, a part to be corrected 201 has the same pronunciation as that of correction information 202 but is incorrect in writing in Chinese characters.

Figure 7C:
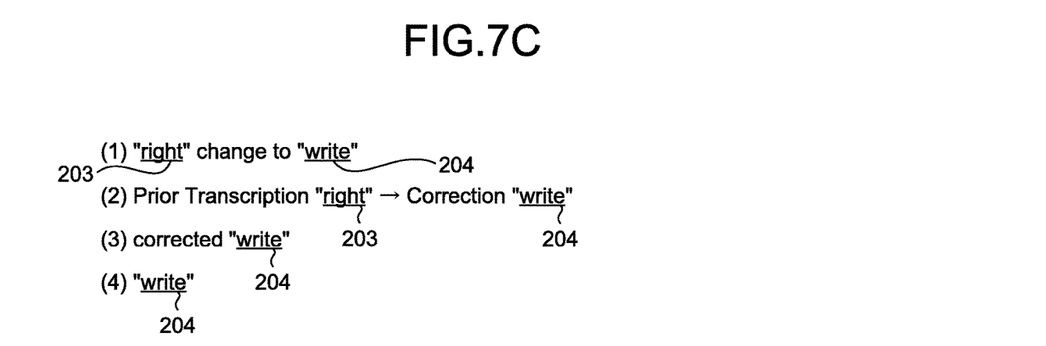
FIG. 7C is a diagram that illustrates application examples (in the case of English) corresponding to the display formats of FIG. 7A.

FIG. 7C is a diagram illustrating application examples (in the case of English) corresponding to the display formats of FIG. 7A. In the examples of FIG. 7C, a part to be corrected 203 is a homophone of correction information 204.

Even in use of the display format (3) and the display format (4), a part to be corrected can be indicated by utilizing a position for generating a dialogue balloon (see FIG. 9B in the later description) and an arrow (see FIG. 9C in the later description) pointing the part to be corrected.

Referring back to FIG. 6, the generating unit 14 generates at least a piece of corrected display information including at least one of the above-described correction information and the above-described part to be corrected using a display format corresponding to the degree of association calculated by Expression (1) (Step S43).

The display format for displaying the corrected display information includes a phrase to increase legibility of the corrected display information depending on the degree of association. For example, if the degree of association is equal to or greater than 0.8, the generating unit 14 generates the corrected display information using the display format (1). In another case, if the degree of association is equal to or greater than 0.6 (a fourth threshold), the generating unit 14 generates the corrected display information using the display format (2). Likewise, if the degree of association is equal to or greater than 0.3, the generating unit 14 generates the corrected display information using the display format (3). If the degree of association is equal to or greater than 0.2 (the third threshold) and less than 0.3, the calculation unit 13 generates the corrected display information using the display format (4).

The generating unit 14 thereafter determines whether the processing has been done to all the parts to be corrected having a degree of association of equal to or greater than the threshold (the third threshold) (Step S44). If the processing has not yet been done to all the parts to be corrected (No at Step S44), the generation processing returns to Step S41. If the processing has been done to all the parts to be corrected (Yes at Step S44), the generation processing is completed.

Display Processing for Corrected Display Information

Figure 8:
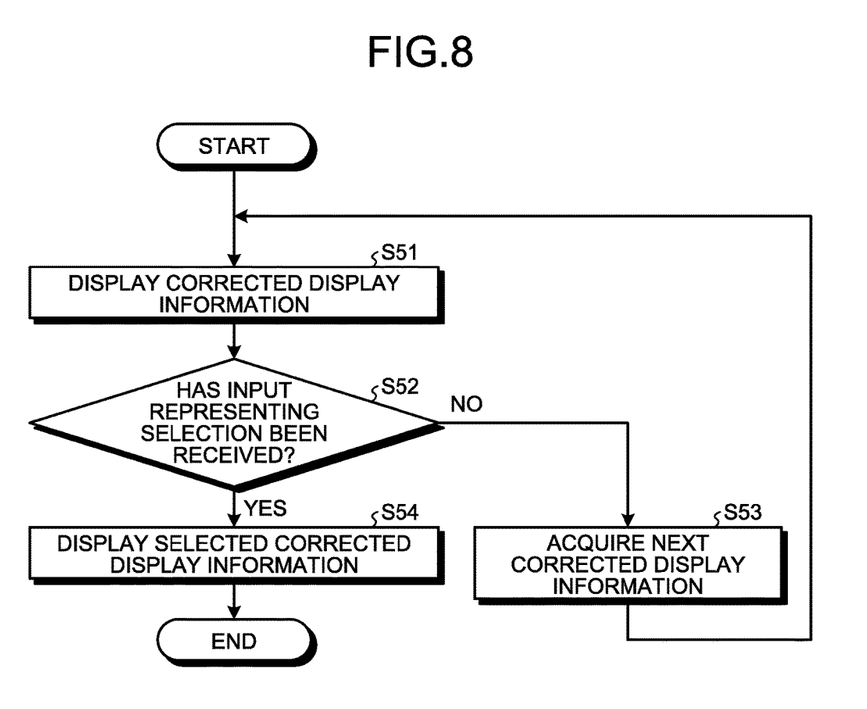
FIG. 8 is a flowchart illustrating exemplary display processing in the embodiment.

FIG. 8 is a flowchart illustrating exemplary display processing in the embodiment. The display control unit 22 displays the above-described corrected display information (Step S51) and determines whether the receiving unit 21 has received an input representing that the corrected display information displayed in the processing of the Step S51 has been selected (Step S52).

If the receiving unit 21 has received no inputs representing selection (No at Step S52), the display control unit 22 acquires the next corrected display information (Step S53), and the process returns to the processing of Step S51.

If the receiving unit 21 has received an input representing selection (Yes at Step S52), the display control unit 22 displays the corrected display information selected in the processing of Step S52 on the display unit 23 (Step S54).

The processing of Step S52 may be omitted. The display control unit 22 may display corrected display information generated based on the degree of association calculated using Expression (1) on the display unit 23 without receiving a selection operation of a user. If the processing of Step S52 is omitted, the display control unit 22 displays corrected display information having the highest degree of association from among the corrected display information displayed based on the degree of association on the display unit 23. The display control unit 22 may display a plurality of pieces of corrected display information generated based on the degree of association all together on the display unit 23 instead of displaying the plurality of pieces of corrected display information one by one.

Examples of the corrected display information displayed on the display unit 23 in the processing of Step S54 will now be described.

Exemplary Corrected Display Information

Figure 9A:
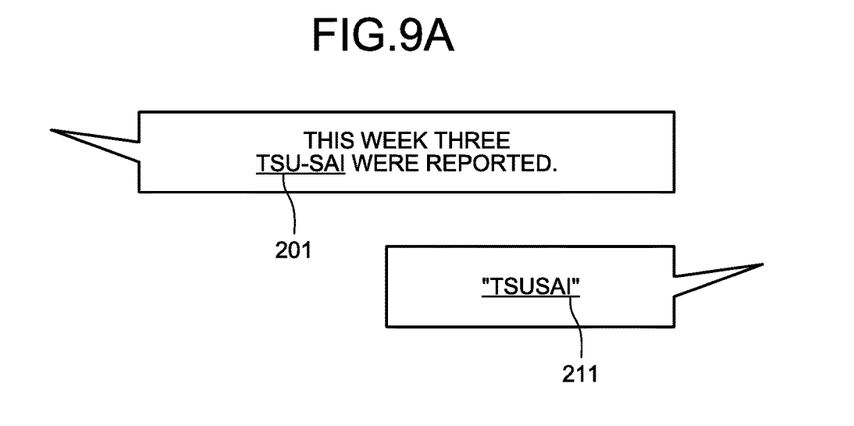
FIG. 9A is a diagram illustrating Example 1 of a display format (display position) for corrected display information in the embodiment.

FIG. 9A is a diagram illustrating Example 1 of a display format (display position) for corrected display information in the embodiment. In the example of FIG. 9A, corrected display information 211 and the part to be corrected 201 are displayed separately from each other using respective dialogue balloons without being associated with each other. In this example, a voice recognition result including the part to be corrected 201 is displayed in a dialogue balloon justified to the left, whereas the corrected display information 211 is displayed in a dialogue balloon justified to the right. In the example of FIG. 9A, the part to be corrected 201 and the corrected display information 211 are not (directly) associated with each other; however, this display allows intuitive understanding of the range (the character string in the dialogue balloon justified to the left) of the voice recognition result including the part to be corrected 201. If the degree of association calculated using Expression (1) is equal to or greater than a first threshold and less than a second threshold, the display control unit 22 displays the corrected display information 211 and the part to be corrected 201 without associating with each other.

Figure 9B:
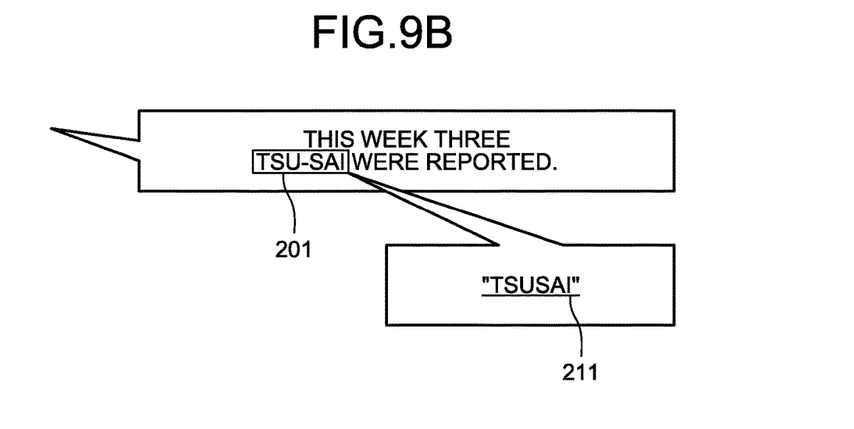
FIG. 9B is a diagram illustrating Example 2 of a display format (display position) for corrected display information in the embodiment.

FIG. 9B is a diagram illustrating Example 2 of a display format (display position) for corrected display information in the embodiment. In the example of FIG. 9B, the corrected display information 211 and the part to be corrected 201 are displayed in respective dialogue balloons associated with each other. In the example of FIG. 9B, the part to be corrected 201 is clearly indicated by arranging the part to be corrected 201 in a box. In addition, the dialogue balloon including the corrected display information 211 is displayed in a manner starting from the part to be corrected 201. If the degree of association calculated using Expression (1) is equal to or greater than a threshold (the second threshold greater than the first threshold), the display control unit 22 displays the corrected display information 211 and the part to be corrected 201 in a manner associated with each other.

Figure 9C:
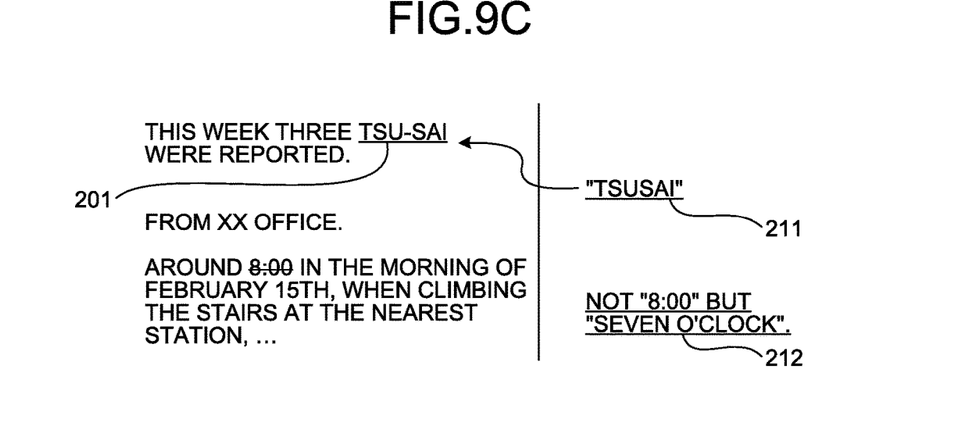
FIG. 9C is a diagram illustrating Example 3 of a display format (display position) for corrected display information in the embodiment.

FIG. 9C is a diagram illustrating Example 3 of a display format (display position) for corrected display information in the embodiment. In the example of FIG. 9C, the display field for the voice recognition result and a display field (an annotation field) for the corrected display information are partitioned from each other.

In this example, the corrected display information 211 is displayed in such a display format that points the voice recognition result including the part to be corrected 201 with an arrow. In the example of FIG. 9C, the part to be corrected 201 and the corrected display information 211 are not (directly) associated with each other. If the degree of association calculated by Expression (1) is equal to or greater than a first threshold and less than a second threshold, the display control unit 22 displays the corrected display information 211 and the part to be corrected 201 without associating with each other.

The corrected display information 212 is displayed in a manner associated with the part to be corrected "8:00" by emphasizing the part to be corrected "8:00" with a strikethrough. If the degree of association calculated by Expression (1) is equal to or greater than a threshold (the second threshold greater than the first threshold), the display control unit 22 displays the corrected display information 212 and the part to be corrected "8:00" in a manner associated with each other. Furthermore, use of the display format (1) in the example of FIG. 7A allows the corrected display information 212 to be displayed in such a manner that the part to be corrected "8:00" included in the voice recognition result is recognizable even in the text of the corrected display information.

An exemplary hardware configuration of the server device 10 and the client device 20 of the embodiment will now be described.

Exemplary Hardware Configuration

Figure 10:
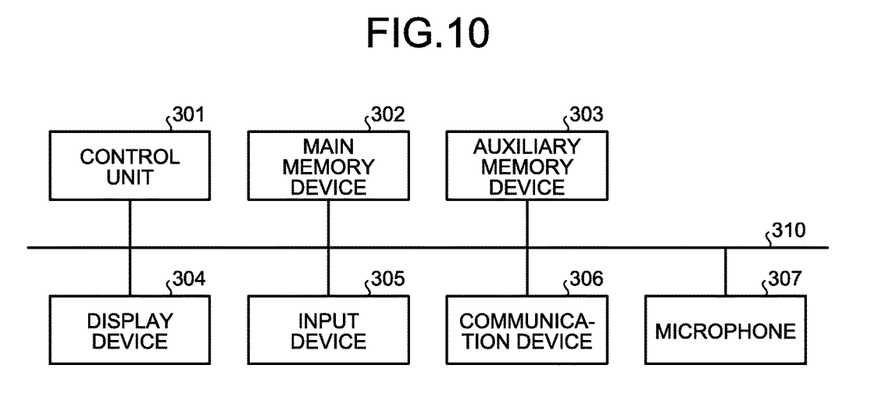
FIG. 10 is a diagram illustrating an exemplary hardware configuration of a server device and a client device in the embodiment.

FIG. 10 is a diagram illustrating an exemplary hardware configuration of the server device 10 and the client device 20 of the embodiment. The server device 10 and the client device 20 in the embodiment each include a control unit 301, a main memory device 302, an auxiliary memory device 303, a display device 304, an input device 305, a communication device 306, and a microphone 307. The control unit 301, the main memory device 302, the auxiliary memory device 303, the display device 304, the input device 305, the communication device 306, and the microphone 307 are connected with one another via a bus 310.

The control unit 301 executes a computer program read from the auxiliary memory device 303 onto the main memory device 302. Examples of the main memory device 302 include a memory such as a read only memory (ROM) and a random access memory (RAM). Examples of the auxiliary memory device 303 include a memory card and a hard disk drive (HDD).

The display device 304 displays information. Examples of the display device 304 include a liquid crystal display. The input device 305 receives information inputs. Examples of the input device 305 include a keyboard and a mouse. The display device 304 and the input device 305 may be implemented, for example, by a liquid crystal touch panel having a display function and an input function. The communication device 306 communicates with other devices. The microphone 307 catches sounds.

The computer program executed by the server device 10 and the client device 20 of the embodiment is stored in a computer-readable memory medium such as a CD-ROM, a memory card, a CD-R, and a digital versatile disk (DVD) as an installable or executable file and provided as a computer program product.

The computer program executed by the server device 10 and the client device 20 of the embodiment may be stored in a computer connected to a network such as the Internet and provided by being downloaded via the network. In another manner, the computer program executed by the server device 10 and the client device 20 of the embodiment may be provided via a network such as the Internet without being downloaded.

The computer program executed by the server device 10 and the client device 20 may be provided by being preliminarily embedded in a ROM or the like.

The computer program executed by the server device 10 and the client device 20 of the embodiment is modularized including functions implementable by the computer program from among the functional configurations of the above-described correction system 100.

The functions implemented by the computer program are loaded onto the main memory device 302 with the control unit 301 reading the computer program from a memory medium such as the auxiliary memory device 303 and executing the computer program. In other words, the functions executed by the computer program are generated on the main memory device 302.

A part of or all of the functions of the correction system 100 of the embodiment may be implemented by hardware such as an integrated circuit (IC).

As described above, in the correction system 100 in the embodiment, the receiving unit 21 receives correction information for correcting a voice recognition result. The calculation unit 13 estimates a part to be corrected included in the voice recognition result and calculates the degree of association between the part to be corrected and the correction information. The generating unit 14 generates corrected display information including at least one of the correction information and the part to be corrected using a display format corresponding to the degree of association. The display control unit 22 displays the corrected display information.

With the correction system 100 of the embodiment, the voice recognition result can be properly corrected in real time. More specifically, such correction results can be presented that do not disturb the flow of the speech and have high legibility for viewers while reducing the cost of an editor correcting the captions displayed in real time.

With this configuration, the user (editor) of the correction system 100 does not need to follow the target range to be corrected included in the voice recognition result displayed in real time or to designate the range to be corrected. With the correction system 100 of the embodiment, the corrected display information is generated in the display formats illustrated in FIGS. 7A to 7C. The user of the correction system 100 thus only has to input minimum necessary correction information. Quicker correction can be therefore achieved compared with conventional methods.

Moreover, the correction system 100 of the embodiment changes the display formats (for example, see FIGS. 7A to 7C and FIGS. 9A to 9C) for displaying the corrected display information based on the degree of association calculated by earlier-described Expression (1), which exerts advantageous effects in properly correcting the voice recognition result.

The correction system 100 of the embodiment allows real-time recognition and correction of uttered voices such as a speech of a teacher in the lecture and in the class and conversations on the meeting. For example, distributing voice recognition results and corrected display information to a device for displaying a caption prepared in the conference room as well as display terminals in hand such as a personal computer and a tablet ensures provision of information for supporting the hearing-impaired.

Disability Discrimination Act was enforced in April 2016, and based on such a social background, the correction system 100 of this embodiment is expected to be one of good examples to enhance the information support by being used in variety of applications and places having not been satisfied with conventional manual note-taking manners.

From the above-described background, the correction system 100 of the embodiment can correct a voice recognition result output in real time as necessary and provide as accurate information as possible at a low cost.

On occasions having been out of the benefits of the information support, such as a small meeting and a small conference, and in face-to-face communication in business, at reception counters, and the like, information can be appropriately exchanged while correcting errors without using any special techniques for correcting those errors. As a result of this, less stressful communication can be achieved between a hearing person and a hearing-impaired or a deaf person.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A correction system comprising:
an interface system configured to receive correction information for correcting a voice recognition result;
a calculator, implemented in computer hardware, configured to estimate a part of the voice recognition result to be corrected and calculate a degree of association between the part to be corrected and the correction information;
a generator, implemented in computer hardware, configured to generate corrected display information comprising at least one of the correction information and the part to be corrected using a display format corresponding to the degree of association; and
a display controller configured to output the corrected display information on a display, wherein
the display controller outputs for displaying the part to be corrected and the corrected display information without being associated with each other when the degree of association is equal to or greater than a first threshold and less than a second threshold.

2. The correction system according to claim 1, wherein the calculator calculates the degree of association based at least in part on at least one of a degree of association between sound of the part to be corrected and the correction information, a degree of association in a part of speech between the part to be corrected and the correction information, and a degree of association in a surface expression between the part to be corrected and the correction information.

3. The correction system according to claim 1, wherein the generator generates the corrected display information comprising the correction information if the degree of association is equal to or greater than a third threshold.

4. The correction system according to claim 3, wherein the generator further generates the corrected display information comprising the correction information and the part to be corrected if the degree of association is equal to or greater than a fourth threshold, the second threshold being greater than the third threshold.

5. The correction system according to claim 1, wherein the display controller outputs for displaying the part to be corrected and the corrected display information by being associated with each other when the degree of association is equal to or greater than the second threshold.

6. The correction system according to claim 1, wherein the generator generates a plurality of pieces of corrected display information in a display format corresponding to the degree of association, and
the display controller outputs for displaying a selected piece of corrected display information from the plurality of pieces of corrected display information pieces.

7. The correction system according to claim 1, wherein the display format for the corrected display information comprises a phrase to increase legibility of the corrected display information depending on the degree of association.

8. A method of correction executed by a correction system comprising:
receiving correction information for correcting a voice recognition result;
estimating a part of the voice recognition result to be corrected and calculating a degree of association between the part to be corrected and the correction information;
generating corrected display information comprising at least one of the correction information and the part to be corrected using a display format corresponding to the degree of association; and
outputting the corrected display information on a display, wherein
the outputting outputs for displaying the part to be corrected and the corrected display information without being associated with each other when the degree of association is equal to or greater than a first threshold and less than a second threshold.

9. A computer program product comprising a non-transitory computer-readable medium that stores therein a computer program that causes a computer to function as:
an interface system configured to receive correction information for correcting a voice recognition result;
a calculator configured to estimate a part of the voice recognition result to be corrected and calculate a degree of association between the part to be corrected and the correction information;
a generator configured to generate corrected display information comprising at least one of the correction information and the part to be corrected using a display format corresponding to the degree of association; and
a display controller configured to output the corrected display information on a display, wherein
the display controller outputs for displaying the part to be corrected and the corrected display information without being associated with each other when the degree of association is equal to or greater than a first threshold and less than a second threshold.

* * * * *